(12) United States Patent
Vega et al.

(10) Patent No.: US 7,383,405 B2
(45) Date of Patent: Jun. 3, 2008

(54) SYSTEMS AND METHODS FOR VOLUNTARY MIGRATION OF A VIRTUAL MACHINE BETWEEN HOSTS WITH COMMON STORAGE CONNECTIVITY

(75) Inventors: Rene Antonio Vega, Kirkland, WA (US); Eric P. Traut, Bellevue, WA (US); Mike Neil, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 513 days.

(21) Appl. No.: 10/882,972

(22) Filed: Jun. 30, 2004

(65) Prior Publication Data

US 2006/0005189 A1    Jan. 5, 2006

(51) Int. Cl.
*G06F 12/00* (2006.01)
*G06F 9/26* (2006.01)
(52) U.S. Cl. .................. 711/162; 711/202; 711/203
(58) Field of Classification Search .................. 711/162
See application file for complete search history.

(56) References Cited

U.S. PATENT DOCUMENTS

| | | | |
|---|---|---|---|
| 5,437,033 A | 7/1995 | Inoue et al. | 714/10 |
| 6,587,937 B1 * | 7/2003 | Jensen et al. | 711/173 |
| 6,654,794 B1 * | 11/2003 | French | 709/217 |
| 2003/0187915 A1 | 10/2003 | Sun et al. | 709/201 |
| 2004/0010787 A1 * | 1/2004 | Traut et al. | 718/1 |
| 2005/0268298 A1 * | 12/2005 | Hunt et al. | 718/1 |

FOREIGN PATENT DOCUMENTS

| | | |
|---|---|---|
| EP | 0 333 617 B1 | 5/1995 |
| EP | 1 083 483 A1 | 3/2001 |
| GB | 2 256 513 A | 12/1992 |

\* cited by examiner

*Primary Examiner*—Hyung Sough
*Assistant Examiner*—Hamdy S Ahmed
(74) *Attorney, Agent, or Firm*—Woodcock Washburn LLP

(57) ABSTRACT

The present invention is a system and method that performs disk migration in a virtual machine environment. The present invention quickly and easily migrates a virtual machine from one host to another thus improving flexibility and efficiency in a virtual machine environment for "load balancing" systems, performing hardware or software upgrades, handling disaster recovery, and so on. Certain of the embodiments are specifically directed to providing a mechanism for migrating the disk state along with the device and memory states, where the disk data resides in a remotely located storage device that is common to multiple host computer systems in a virtual machine environment. The virtual machine migration process, which includes disk data migration, occurs without the user's awareness and, therefore, without the user's experiencing any noticeable interruption.

21 Claims, 5 Drawing Sheets

SYSTEMS AND METHODS FOR VOLUNTARY MIGRATION OF A VIRTUAL MACHINE BETWEEN HOSTS WITH COMMON STORAGE CONNECTIVITY

CROSS-REFERENCE

This application is related by subject matter to the inventions disclosed in the following commonly assigned application: U.S. patent application No. 2004/0010787, filed on Jul. 11, 2002 and entitled "METHOD FOR FORKING OR MIGRATING A VIRTUAL MACHINE," the entirety of which is hereby incorporated by reference herein.

FIELD OF THE INVENTION

The present invention generally relates to the field virtual machines (also known as "processor virtualization") and software that executes in a virtual machine environment. More specifically, the present invention is directed to voluntary migration of a virtual machine between hosts with common storage connectivity.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Computer manufacturers want to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus the host computer can both run software design for its own hardware architecture and software written for computers having an unrelated hardware architecture. As a more specific example, a computer system manufactured by Apple Computer, for example, may run operating systems and program written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a "virtual machine" as the guest computer system only exists in the host computer system as a pure software representation of the operation of one specific hardware architecture. The terms emulator, virtual machine, and processor emulation are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system.

The emulator program acts as the interchange between the hardware architecture of the host machine and the instructions transmitted by the software running within the emulated environment. This emulator program may be a host operating system (HOS), which is an operating system running directly on the physical computer hardware. Alternately, the emulated environment might also be a virtual machine monitor (VMM) which is a software layer that runs directly above the hardware and which virtualizes all the resources of the machine by exposing interfaces that are the same as the hardware the VMM is virtualizing (which enables the VMM to go unnoticed by operating system layers running above it). A host operating system and a VMM may run side-by-side on the same physical hardware.

One of the many advantages of a virtual machine (VM) over a physical machine is the ability to quickly and cheaply create multiple instances of the same virtual machine. If allowed by the virtual machine implementation, multiple virtual machines can exist simultaneously in a single host machine (host computer system) environment, and resources of the host machine can be divided among the various virtual machines. This flexible resource allocation becomes even more useful when combined with the ability to move, or "migrate," virtual machines from one host machine to another.

Being able to migrate a virtual machine quickly and easily from one host machine to another is useful, for example, for "load balancing" systems, performing hardware or software upgrades, or handling disaster recovery. More specifically, if a virtual machine requires more processing power than is available on one host machine, it can be moved to another host machine that has extra capacity. Second, if the host machine requires hardware maintenance or a software upgrade, the virtual machine may be migrated from one physical machine to another temporarily, which thereby allows the first physical machine to be taken down and upgraded. Last, in the case of disaster recovery, if, for example, an impending flood or storm is predicted, all virtual machines of a datacenter can be migrated to another datacenter that is out of harm's way and then migrated back when the threat passes. In all cases, this allows, for example, critical business applications to remain up and running without interruption and without the user even being aware of the interruption.

Performing a VM migration process involves moving all the states of the virtual machine. These states include three areas: (1) the VM virtualized device state, which is the internal states of all virtualized controllers and motherboard virtualized devices, such as the virtualized interrupt controller, virtualized SCSI controller, and virtualized video controller; (2) the VM memory state; and (3) the VM disk state, which is the persistent storage.

Methods have been described for migrating the device state and memory state of virtual machines. For example, U.S. patent application No. 2004/0010787, filed on Jul. 11, 2002 and entitled "METHOD FOR FORKING OR MIGRATING A VIRTUAL MACHINE" (hereinafter, the '787 patent application) describes a method for increasing the efficiency of virtual machine processing. A parent virtual machine is provided on a host computer. The parent virtual machine is temporarily or permanently suspended. A child virtual machine is created at a new location by forking the parent virtual machine. However, the child virtual machine may not initially include all the stored data that is associated with the parent virtual machine.

The reason for this shortcoming is that physically copying disk data from one host machine to another is impractical because of the large volume of data (e.g., a terabyte or more) and, consequently, the time required to perform a copy of such a large amount of data. So while the '787 patent application discusses the migration of the device state and the memory state of a virtual machine, the '787 patent application does not provide a technique for migrating the disk state of a virtual machine. Therefore, what is needed is a way to perform a virtual machine migration process, including the disk state, without the user's awareness and, therefore, without the user's experiencing any noticeable interruption.

In addition to the foregoing, there are also instances where the disk space associated with a virtual machine is not located locally, but instead, is located in a central storage point, such as a remotely located storage area network (SAN) or network attached storage (NAS) server, which serves several physical host machines. What is needed is a way to quickly disconnect and reconnect a remotely located storage device between two hosts during the virtual machine migration process and, furthermore, to handle disk transactions during the migration process that are still in process in the active virtual machine.

SUMMARY OF THE INVENTION

Several embodiments of the present invention provide a means for quickly and easily migrating a virtual machine from one host to another and, thus, improving flexibility and efficiency in a virtual machine environment for "load balancing" systems, performing hardware or software upgrades, handling disaster recovery, and so on. Certain of these embodiments are specifically directed to providing a mechanism for migrating the disk state along with the device and memory states, where the disk data resides in a remotely located storage device that is common to multiple host computer systems in a virtual machine environment. For various embodiments, the virtual machine migration process, which includes disk data migration, occurs without the user's awareness and, therefore, without the user's experiencing any noticeable interruption.

Certain embodiments of the present invention are directed to a system for and method of performing disk migration in a virtual machine environment. The method includes the steps of performing pre-migration checks to confirm hardware readiness, initiating the migration process by pausing the virtual machine on a first host and transferring the device and memory states to a second virtual machine created on a second host, transferring minimal disk information from the first host to the second host, the first host's releasing of the exclusive connection to the external storage device wherein the virtual hard drive (VHD) file for the virtual machine physically resides, the second host's acquiring of the exclusive connection to the external storage device, activating the replicated virtual machine on the second host, and deleting the virtual machine on the first host.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The inventive subject matter is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
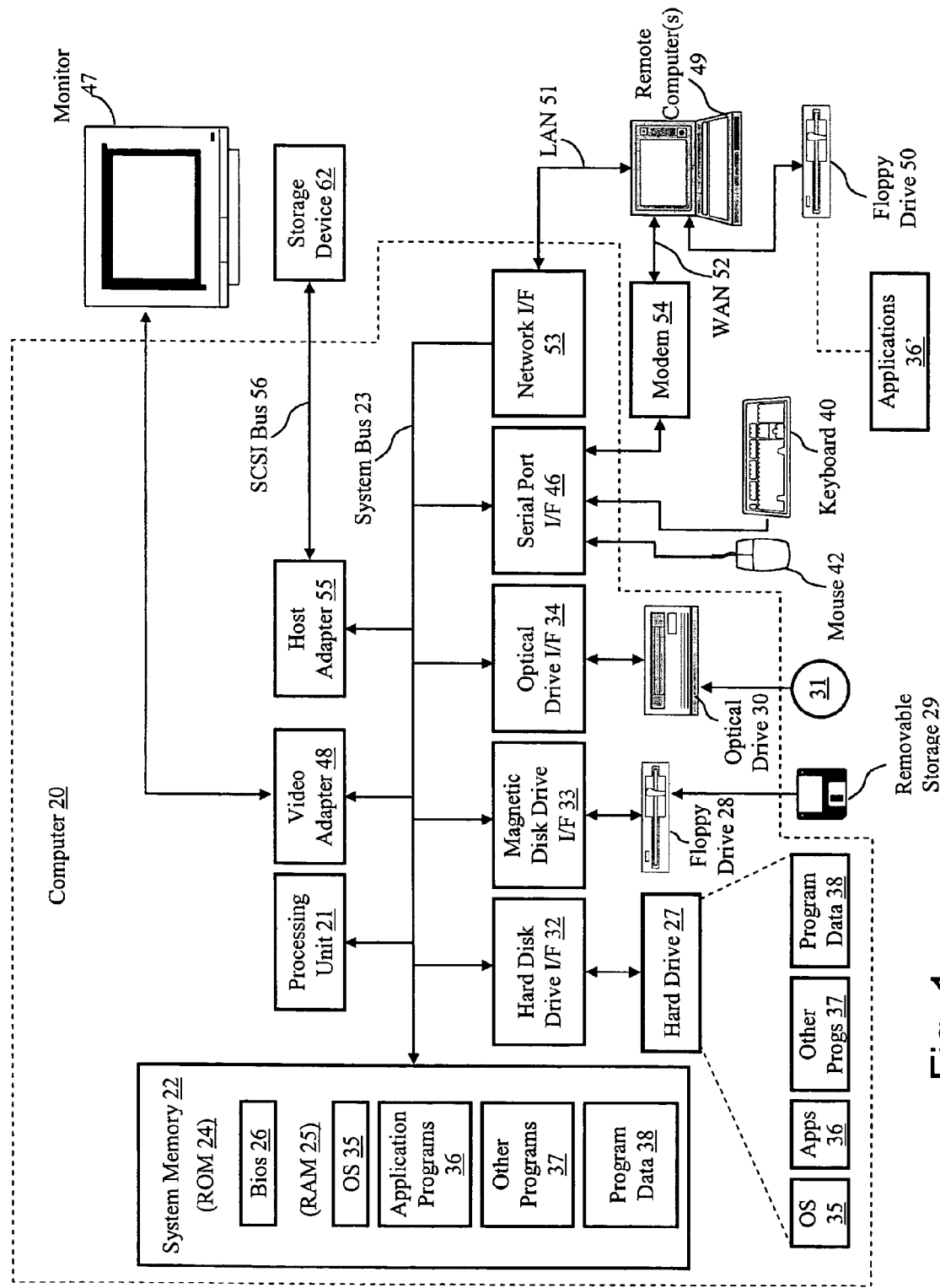
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present invention are particularly well-suited for computerized systems, nothing in this document is intended to limit the invention to such embodiments.

Virtual Machines

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack.

For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that said software layers are running on their own private computer system, and thus VMs can allow multiple "guest systems" to run concurrently on a single "host system."

Figure 2:
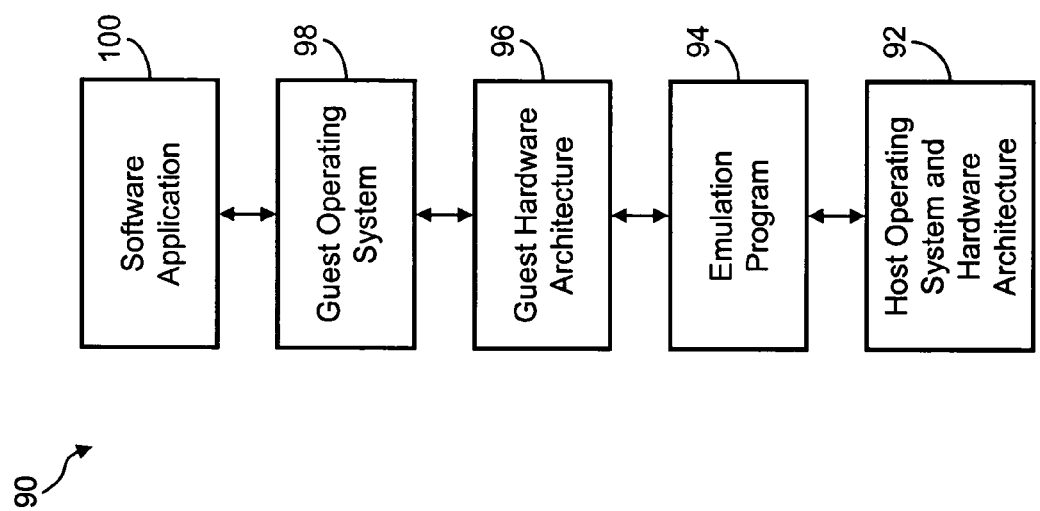
FIG. 2 illustrates the logical layering of the hardware and software architecture for an emulated operating environment in a computer system.

FIG. 2 is a diagram representing the logical layering of the hardware and software architecture for an emulated operating environment in a computer system. An emulation program 94 runs on a host operating system and/or hardware architecture 92. Emulation program 94 emulates a guest hardware architecture 96 and a guest operating system 98. Software application 100 in turn runs on guest operating system 98. In the emulated operating environment of FIG. 2, because of the operation of emulation program 94, software application 100 can run on the computer system 90 even though software application 100 is designed to run on an operating system that is generally incompatible with the host operating system and hardware architecture 92.

Figure 3:
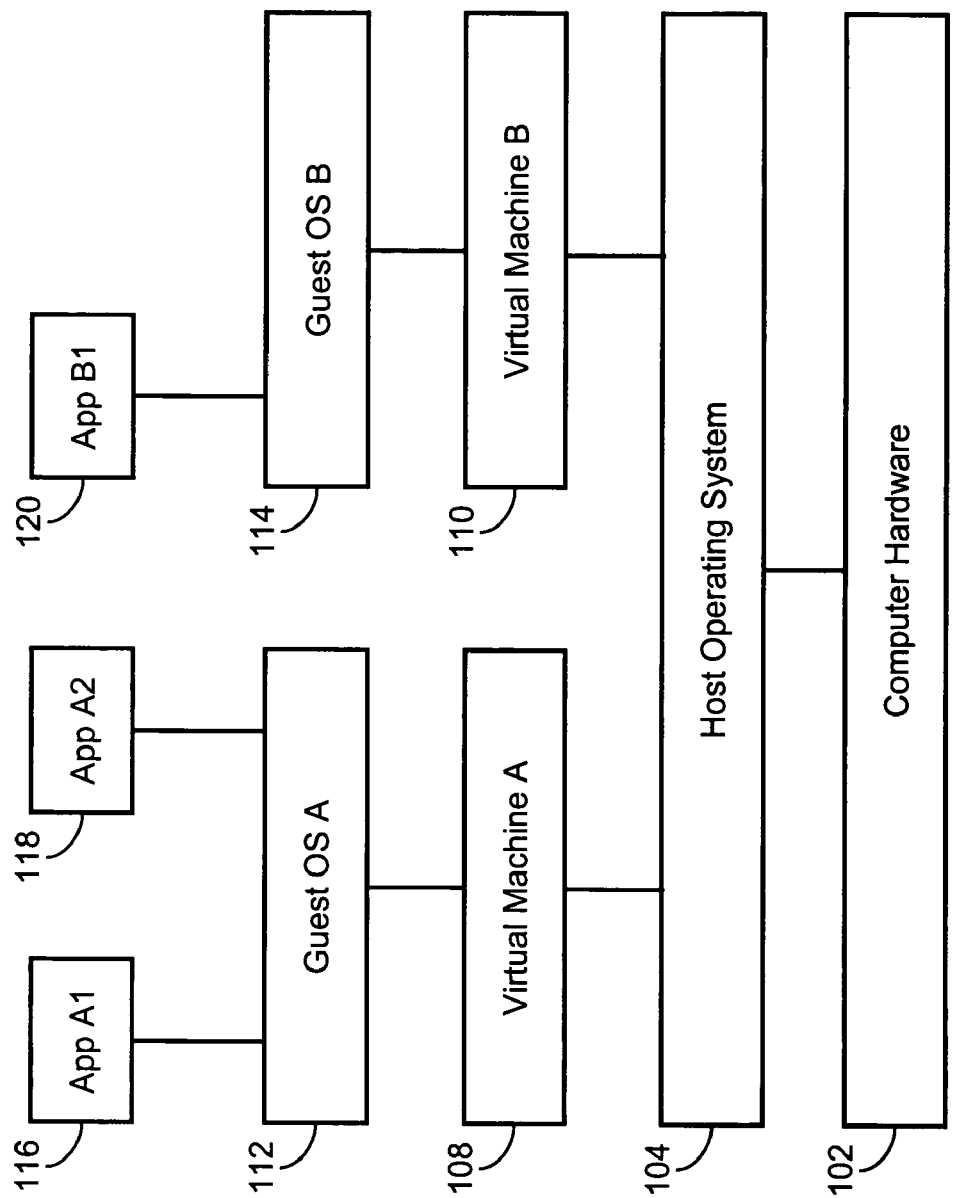
FIG. 3 illustrates a virtualized computing system.

FIG. 3 illustrates a virtualized computing system comprising a host operating system software layer 104 running directly above physical computer hardware 102, and the host operating system (host OS) 104 virtualizes all the resources of the machine by exposing interfaces that are the same as the hardware the host OS is virtualizing (which enables the host OS to go unnoticed by operating system layers running above it).

Referring again to FIG. 3, above the host OS 104 are two virtual machine (VM) implementations, VM A 108, which may be, for example, a virtualized Intel 386 processor, and VM B 110, which may be, for example, a virtualized version of one of the Motorola 680X0 family of processors. Above each VM 108 and 110 are guest. operating systems (guest OSs) A 112 and B 114 respectively. Above guest OS A 112 are running two applications, application The present invention is a system and method that performs disk migration in a virtual machine environment. The present invention quickly and easily migrates a virtual machine from one host to another thus improving flexibility and efficiency in a virtual machine environment for "load balancing" systems, performing hardware or software upgrades, handling disaster recovery, and so on. Certain of the embodiments are specifically directed to providing a mechanism for migrating the disk state along with the device and memory states, where the disk data resides in a remotely located storage device that is common to multiple host computer systems in a virtual machine environment. The virtual machine migration process of the present invention, which includes disk data migration, occurs without the user's awareness and, therefore, without the user's experiencing any noticeable interruption. A1 116 and application A2 118, and above guest OS B 114 is application B1 120.

In regard to FIG. 3, it is important to note that VM A 108 and VM B 110 are virtualized computer hardware representations that exist only as software constructions and which are made possible due to the presence of specialized software code that not only presents VM A 108 and VM B 110 to Guest OS A 112 and Guest OS B 114 respectively, but which also performs all of the software steps necessary for Guest OS A 112 and Guest OS B 114 to indirectly interact with the real physical computer hardware 102. This complete functionality can be referred to as a virtual machine monitor (VMM) (not shown) where, for certain embodiments (such as the one illustrated in FIG. 3), the VMM comprises part of the host operating system 104. However, in other embodiments the VMM may be an application running above the host operating system 104 and interacting with the computer hardware only through said host operating system 104. In yet other embodiments, the VMM may comprise a partially independent software system that on some levels interacts indirectly with the computer hardware 102 via the host operating system 104 but on other levels the VMM interacts directly with the computer hardware 102 (similar to the way the host operating system interacts directly with the computer hardware). And in yet other embodiments, the VMM may comprise a fully independent software system that on all levels interacts directly with the computer hardware 102 (similar to the way the host operating system interacts directly with the computer hardware) without utilizing the host operating system 104 (although still interacting with said host operating system 104 insofar as coordinating use of said computer hardware 102 and avoiding conflicts and the like).

All of these variations for implementing the VMM are anticipated to form alternative embodiments of the present invention as described herein, and nothing herein should be interpreted as limiting the invention to any particular VMM configuration. In addition, any reference to interaction between applications 116, 118, and 120 via VM A 108 and/or VM B 110 respectively (presumably in a hardware emulation scenario) should be interpreted to be in fact an interaction between the applications 116, 118, and 120 and a VMM. Likewise, any reference to interaction between applications VM A 108 and/or VM B 110 with the host operating system 104 and/or the computer hardware 102 (presumably to execute computer instructions directly or indirectly on the computer hardware 102) should be interpreted to be in fact an interaction between the VMM and the host operating system 104 or the computer hardware 102 as appropriate.

Disk Migration in a Virtual Machine Environment

Figure 4:
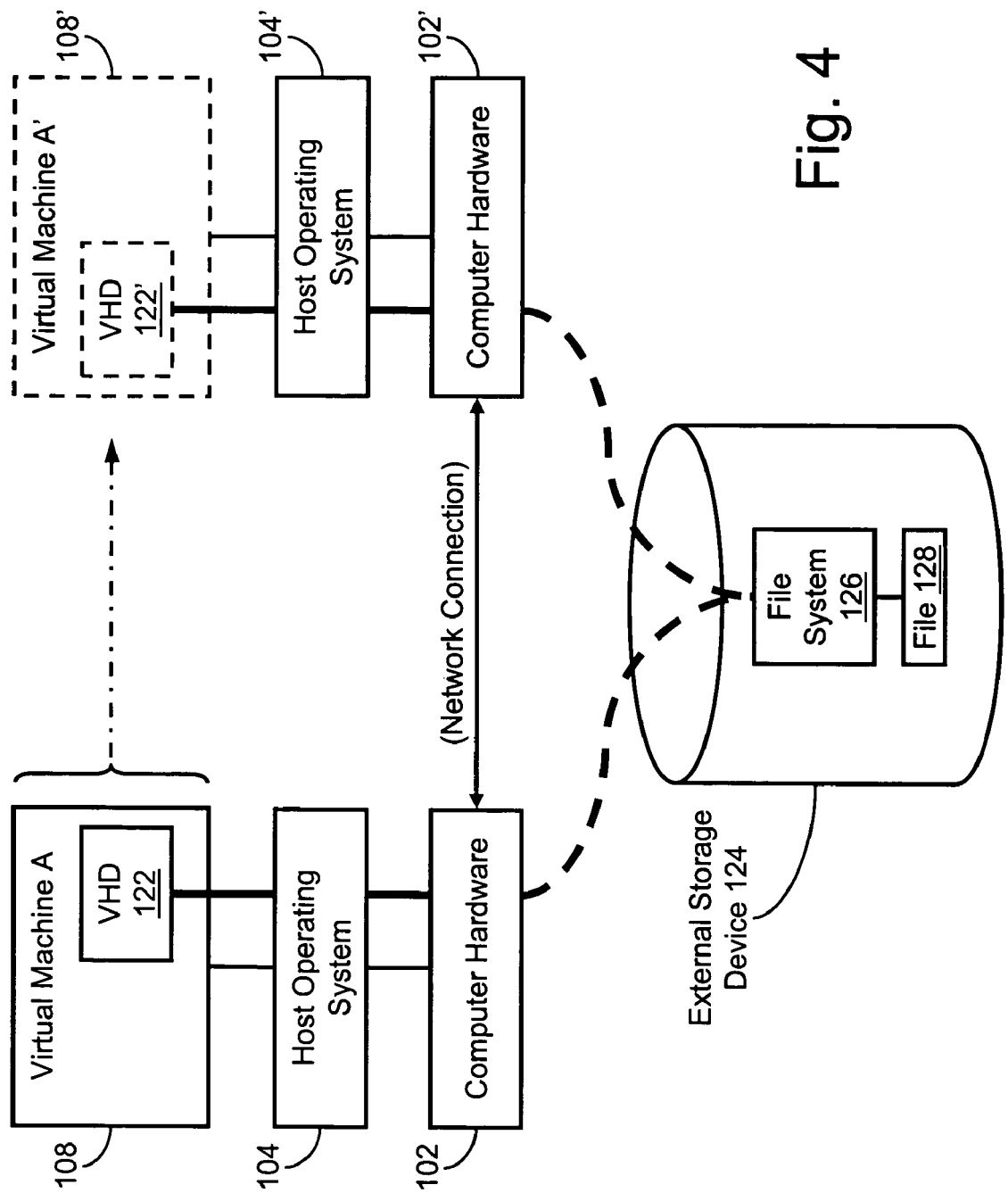
FIG. 4 is a block diagram that illustrates two instantiations of the system, shown in FIG. 3, connected to common external storage, in a preferred embodiment of the invention for performing disk migration in a virtual machine environment.

FIG. 4 is a block diagram that illustrates two instantiations of the system shown in FIG. 3, connected to common external storage in a preferred embodiment of the invention for performing disk migration in a virtual machine environment. More specifically, the networked system of FIG. 4 includes a first system comprising computer hardware 102, host OS 104, and VM A 108 that further includes a virtual hard drive (VHD) 122. Additionally, the networked system of FIG. 4 includes a second system comprising computer hardware 102', host OS 104', and VM A' 108' that further includes a VHD 122', wherein VM A' 108' and VHD 122' are representative of a replication of VM A 108 and VHD 122 that results from the voluntary and dynamic migration of VM A 108 from host OS 104 to host OS 104'. Computer hardware 102 of host OS 104 and computer hardware 102' host OS 104' are networked via, for example, an Ethernet connection to a common external storage device 124, such as a LAN or NAS server. The connection is via a standard communication mechanism, such as a fiber-based host bus adaptor or fiber channel adaptor, which provides a dedicated communication path between computer hardware 102 or computer hardware 102' and external storage device 124.

As known and understood by those skilled in the art, a VHD is a virtualized device, logically equivalent to a physical hard drive device, that a virtual machine emulates for a guest operating system. (As used herein, the terms "hard disk," "hard drive," and "hard disk drive" may be used interchangeably.) In FIG. 4, VM A 108 comprises VHD 122 which, for example, the virtual machine may emulate for guest OS A 112 as hard drive "C:" (not shown). VHD 122 is maintained by a file system 126 of external storage device 124. In this embodiment, VHD 122 is implemented as a single data file, file 128, on the physical hard disk of external storage device 124. Of course, as will be understood and readily appreciated by those skilled in the art, these VHD representations may be located in several files and across separate hard drives or separate computer systems, or they can be something other than a file (for example, a table in a database, a database, a block of active memory, etc.).

In the event that a need arises to migrate VM A from host OS 104 to host OS 104', such as for load balancing, software upgrades, hardware maintenance, or for reasons of disaster recovery, the device state and memory state of VM A are transferred to host OS 104', according to Microsoft patent application 20040010787, entitled, "Method for forking or migrating a virtual machine," via a standard network connection between computer hardware 102 and computer hardware 102'. The '787 patent application, incorporated herein by reference, describes that, when a virtual machine is migrated, the original virtual machine is permanently suspended, and a copy runs in a new location. One way to implement migration involves saving the device state and the entire memory state of the virtual machine to a file on disk, then copying the file to the new host and restoring the machine state.

Again referencing FIG. 4, a system for migrating the disk state of VM A 108 is provided in accordance with the invention. More specifically, since host OS 104 and host OS 104' may both communicate with external storage device 124, no disk data actually needs to be migrated. Instead, host OS 104 sends only enough disk information (such as a pointer, URL, or any reference mechanism) to host OS 104', such that host OS 104' knows how to access this same data storage area, i.e., file 128, which is associated with VHD 122 of VM A 108. SANs or NASs allow this; thus, the data never actually moves—it just appears in a different location and thereby achieves higher performance than a traditional disk migration process would achieve. However, as part of the migration process, the VM A 108 must coordinate with the underlying storage system, i.e., external storage device 124, by flushing buffers, closing volumes, etc. While host OS 104 and host OS 104' are both connected to external storage device 124, file system 126 allows only exclusive access to file 128; thus, only one entity may mount the volume associated with VHD 122 (or VHD 122') at any given time. The migration process of VM A 108 of host OS 104 to VM A' 108' of host OS 104' that uses the networked system of FIG. 4 is described in detail in reference to FIG. 5.

Figure 5:
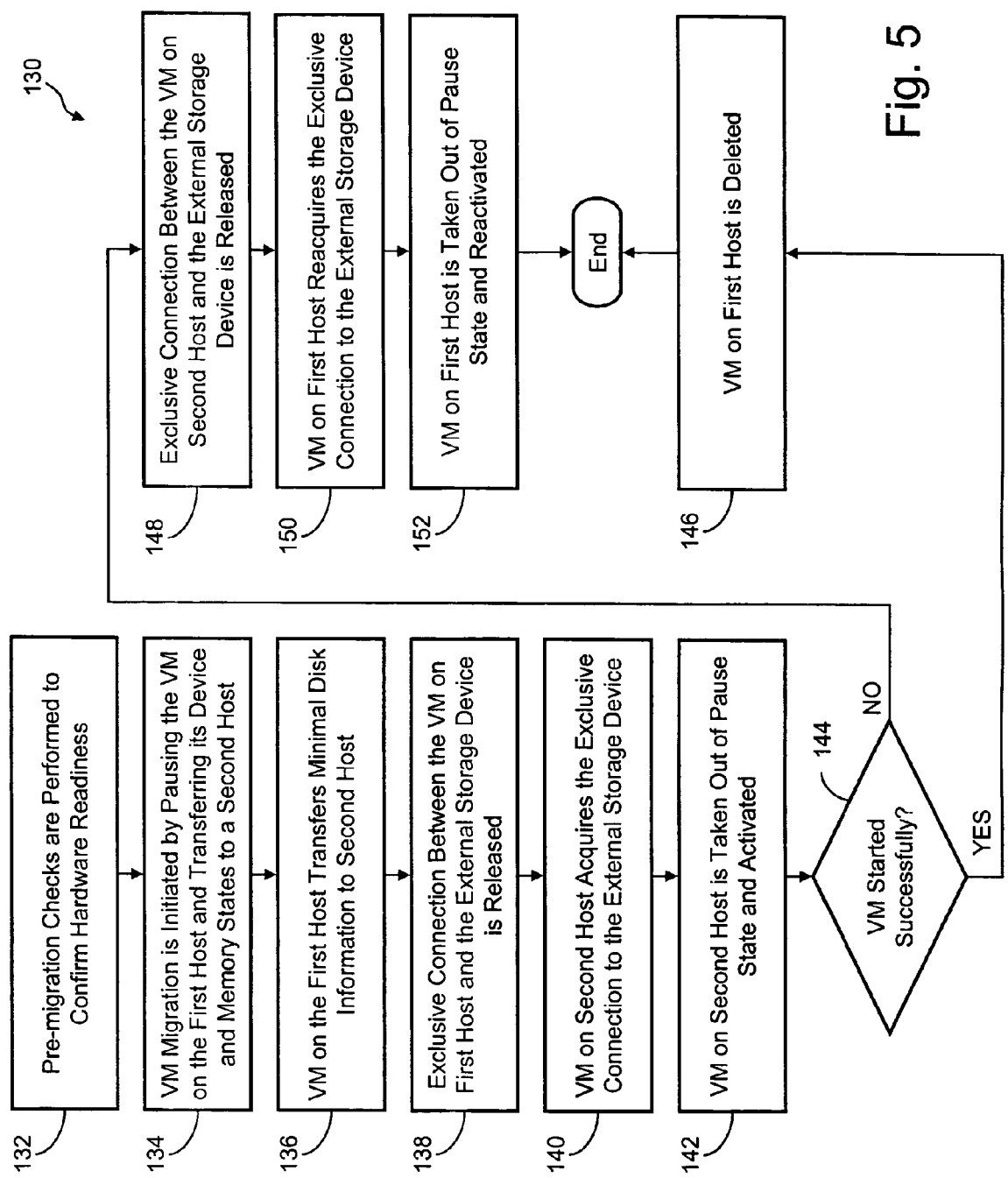
FIG. 5 is a flowchart that illustrates a method of performing disk migration in a virtual machine environment.

FIG. 5 is a flowchart that illustrates a method 130 of performing disk migration in a virtual machine environment. With host OS 104 initially having exclusive access to file system 128 of external storage device 124, the method first comprises, at step 132, performing a series of pre-migration checks in order to confirm the hardware readiness of both hosts and external storage device 124. For example, it is confirmed that file 128 is visible to both host OS 104 and host OS 104', which thereby confirms connectivity to external storage device 124; it is confirmed that sufficient memory exists in host OS 104'; it is confirmed that sufficient processor resources exist in host OS 104'; it is confirmed that the correct software version exists in host OS 104'; and so on.

At step 134, the migration process is initiated (either manually or automatically for initiation as well as for any or all steps herein indicated) by pausing the VM A 108 on host OS 104 and transferring its device and memory states to host OS 104', according to the '787 patent application. At this point in time, VM A 108 and VM A' 108' both exist briefly in a paused state, for a period of time long enough to transfer critical device state and critical memory state information from VM A 108 to VM A' 108'. For example, the state of the processor registers, the state of the virtual hardware, and a small amount of working memory are migrated from VM A 108 to VM A' 108'. The memory is transferred incrementally by use of a "demand paging" process, wherein the memory of VM A 108 is prioritized, based on what VM A' 108' actively requires, as is described in the '787 patent application.

At step 136, host OS 104 sends only enough disk information (such as a pointer, URL, or any reference mechanism) to host OS 104', such that host OS 104' knows how to access file 128.

At step 138, the exclusive connection between VM A 108 on host OS 104 and external storage device 124 is released and thereby relinquishes its exclusive connection to file 128, which is the physical resource of VHD 122. When exclusive access to file 128 is relinquished, VM A 108 flushes all its cached data, i.e., flushes the buffers to external storage device 124, in order to close this connection.

At step 140, VM A' 108' on host OS 104' acquires the exclusive connection to file 128 on external storage device 124. During the acquisition process, VM A' 108' may have to try repeatedly while VM A 108 on host OS 104 is flushing buffers and relinquishing access to file 128. A retry limit may be set before VM A' 108' gives up. File system 126 of external storage device 124 serves as the arbiter that enforces the exclusive access to file 128.

At step 142, VM A' 108' on host OS 104' is taken out of the pause state and allowed to become active, while VM A 108 on host OS 104 remains suspended. The amount of time between when VM A 108 on host OS 104 is initially paused and when VM A' 108' on host OS 104' is activated is suitably small, typically less than one second, that the user experiences no apparent interruption resulting from the VM migration process.

At step 144, it is determined whether VM A' 108' on host OS 104' has started successfully. At step 146, if it is determined that VM A' 108' on host OS 104' has started successfully, VM A 108 on host OS 104 is deleted and the method ends.

At step 148, if it is determined that VM A' 108' on host OS 104' has not started successfully, the exclusive connection between VM A' 108' on host OS 104' and external storage device 124 is released and thereby relinquishes its exclusive connection to file 128. One possible reason for failing to start successfully is, for example, that, during the very short time between when VM A 108 on host OS 104 disconnects from external storage device 124 and VM A' 108' on host OS 104' connects to external storage device 124, some other entity has gained access to file 128, which thereby prevents access to file 128. At step 150, VM A 108 on host OS 104 reacquires the exclusive connection to file 128 on external storage device 124. At step 152, VM A 108 on host OS 104 is taken out of the pause state and reactivated, while VM A' 108' on host OS 104' remains in the paused state and the method ends.

Again referencing FIGS. 4 and 5, whether external storage device 124 is implemented as a NAS or SAN, it serves as the arbiter that enforces the exclusive access to file 128. Those skilled in the art will appreciate that a NAS or SAN simply uses different mechanisms for managing the exclusive access. NAS is similar to SAN, except that it does not connect via the fibre channel infrastructure, instead it uses networking protocols. NAS is running at a higher level protocol, which provides file-level access, in contrast with a SAN, which provides block-level access. Furthermore, NAS will allow multiple hosts to mount the volume.

Additionally, the system and method of FIGS. 4 and 5, respectively, provide a way of migrating a virtual machine without stopping it and without reconfiguring the devices, i.e., without knowledge of the guest OS. This transition is transparent to the guest OS (in contrast to reconfiguring the guest OS).

In an alternative embodiment, the networked system of FIG. 4 may exist without a common, shared storage device. In this case, the file system and disk file associated VHD 122 exist on the physical hard drive of computer hardware 102. Therefore, in order to migrate VM A 108 of host OS 104 to VM A' 108' of host OS 104', the entire disk content must be transferred via the network connection therebetween. In such a case, a "trickle" technique or a "demand paging" technique may be used, wherein the VHD data is transferred in increments, similar to memory, but a much larger volume of data. The demand-based "trickle" method is a pull technique. Alternatively, a push method from host OS 104 to host OS 104' is used, wherein all the data is pushed over (without requests) and the migration process is completed only after all the data is received by host OS 104'; host OS 104' then pulls the last small portion of data to complete the transfer. Optionally, in both cases, standard data compression methods may be used to reduce the bandwidth.

Additionally, this "trickle" method can also be used as a fallback method, if the connectivity mechanism fails in the shared storage scenario, as described in FIGS. 4 and 5.

Furthermore, any given single migration may use any or all of the techniques disclosed herein. For example, a single migration may involve a VHD on a SAN, a VHD on a NAS, and a local VHD.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

What is claimed:

1. A method for performing disk migration in a virtual machine environment, said virtual machine environment comprising a first virtual machine comprising a first virtual hard drive and logically coupled to a first host operating system logically coupled to a first computer hardware, and said virtual machine environment further comprising a second virtual machine comprising a second virtual hard drive and logically coupled to a second host operating system logically coupled to a second computer hardware, wherein said second virtual machine is a substantial replica of said first virtual machine, and wherein said first virtual machine is un-paused while said second virtual machine is paused, and said virtual machine environment further comprising at least one external storage device comprising at least one file system comprising at least one file corresponding to both said first virtual hard drive and said second virtual hard drive, where only said first virtual hard drive is initially mounted, said method comprising the following unordered elements:

pausing said first virtual machine on said first host operating system;

transferring a device state and a memory state for said first virtual machine from said first host operating system to said second host operating system;

flushing all cached data from said first virtual hard disk drive to said file;

dismounting said first virtual hard drive by said first host operating system;

transferring from said first host operating system to said second host operating system a set of disk information to enable said second host operating system to access said file;

mounting said second virtual hard drive by said second host operating system; and un-pausing said second virtual machine.

2. The method of claim 1 further comprising performing a series of pre-migration checks.

3. The method of claim 2 wherein said series of pre-migration checks comprise at least one confirming check from among the following group of confirming checks:

confirming that said file is visible to both said first host operating system and said second host operating system;

confirming that sufficient memory resources exist in said second host operating system to support a migration;

confirming that sufficient processor resources exist in said second host operating system to support a migration; and confirming that a correct software versions exists in said second virtual instance.

4. The method of claim 1 further comprising determining whether said second virtual machine has started successfully and:

if said second virtual machine has started successfully, deleting said first virtual machine; and if said second virtual machine has not stoned successfully, then:

dismounting said second virtual hard drive by said second host operating system;

mounting said first virtual hard drive by said first host operating system; and un-pausing said first virtual machine.

5. The method of claim 1 wherein said device state and said memory state comprise at least one specific state from among the following group of specific states: a state of processor registers; a state of virtual hardware; and a state of working memory.

6. The method of claim 1 wherein said memory state is transferred incrementally by use of a demand paging process wherein elements of said memory state of said first virtual machine are prioritized based on what said second virtual machine immediately requires.

7. The method of claim 1 wherein said set of disk information comprises at least one information item from among the follow group of information items: a pointer; a URL; and a reference mechanism.

8. A virtual machine migration system, comprising:

a virtual machine environment comprising a first virtual machine comprising a first virtual herd drive and logically coupled to a first host operating system logically coupled to a first computer hardware;

said virtual machine environment further comprising a second virtual machine comprising a second virtual hard drive and logically coupled to a second host operating system logically coupled to a second computer hardware;

wherein said second virtual machine is a substantial replica of said first virtual machine, and wherein said first virtual machine is un-paused while said second virtual machine is paused;

said virtual machine environment further comprising at least one external storage device comprising at least one tile system comprising at least one file corresponding to both said first virtual hard drive and said second virtual bard drive, where only said first virtual hard drive is initially mounted;

said first virtual machine on said first host operating system that pauses;

a device state and a memory state that is transferred for said first virtual machine from said first host operating system to said second host operating system;

cached data that is flushed from said first virtual hard disk drive to said file;

said first virtual hard drive by said first host operating system that is dismounted;

a set of disk information that is transferred from said first host operating system to said second host operating system to enable said second host operating system to access said file;

said second virtual hard drive that is mounted by said second host operating system; and said second virtual machine that is un-paused.

9. The system of claim 8 further comprising at least one subsystem for performing a series of pre-migration checks.

10. The system of claim 9 wherein said series of pre-migration checks comprise at least one confirming check from among the following group of confirming checks:

confirming that said file is visible to both said first host operating system and said second host operating system;

confirming that sufficient memory resources exist in said second host operating system to support a migration;

confirming that sufficient processor resources exist in said second host operating system to support a migration; and confirming that a correct software versions exists in said second virtual instance.

11. The system of claim 8 further comprising at least one subsystem for determining whether said second virtual machine has started successfully and:

if said second virtual machine has started successfully, deleting said first virtual machine; and if said second virtual machine has not started successfully, then:

dismounting said second virtual hard drive by said second host operating system;

mounting said first virtual hard drive by said first host operating system; and un-pausing said first virtual machine.

12. The system of claim 8 further comprising at least one subsystem whereby said device state and said memory state comprise at least one specific state from among the following group of specific states: a state of processor registers; a state of virtual hardware; and a state of working memory.

13. The system of claim 8 further comprising at least one subsystem whereby said memory state is transferred incrementally by use of a demand paging process wherein elements of said memory state of said first virtual machine are prioritized based on what said second virtual machine immediately requires.

14. The system of claim 8 further comprising at least one subsystem whereby said set of disk information comprises at least one information hem from among the follow group of information items: a pointer; a URL; and a reference mechanism.

15. A computer-readable storage medium for performing disk migration in a virtual machine environment, said virtual machine environment comprising a first virtual machine comprising a first virtual hard drive and logically coupled to a first host operating system logically coupled to a first computer hardware, and said virtual machine environment further comprising a second virtual machine comprising a second virtual hard drive and logically coupled to a second host operating system logically coupled to a second computer hardware, wherein said second virtual machine is a substantial replica of said first virtual machine, and wherein said first virtual machine is un-paused while said second virtual machine is paused, and said virtual machine environment further comprising at least one external storage device comprising at least one file system comprising at least one file corresponding to both said first virtual hard drive and said second virtual hard drive, where only said first virtual hard drive is initially mounted, comprising the following unordered instructions:

an instruction that pauses said first virtual machine on said first host operating system;

an instruction that transfers a device state and a memory state for said first virtual machine from said first host operating system to said second host operating system;

an instruction that flushes all cached data from said first virtual hard disk drive to said file;

an instruction that dismounts said first virtual hard drive by said first host operating system;

an instruction tat transfers from said first host operating system to said second host operating system a set of disk information to enable said second host operating system to access said file;

an instruction that mounts said second virtual hard drive by said second host operating system; and an instruction that un-pauses said second virtual machine.

16. The computer-readable storage medium comprising computer-readable instructions of claim 15 further comprising instructions that perform a series of pre-migration checks.

17. The computer-readable storage medium comprising computer-readable instructions of claim 16 further comprising instructions whereby said series of pre-migration checks comprise at least one confirming check from among the following group of confirming checks:

confirming that said file is visible to both said first host operating system and said second host operating system;

confirming that sufficient memory resources exist in said second host operating system to support a migration;

confirming that sufficient processor resources exist in said second host operating system to support a migration; and confirming that a correct software versions exists in said second virtual instance.

18. The computer-readable storage medium comprising computer-readable instructions of claim 15 further comprising instructions whether said second virtual machine has started successfully and:

if said second virtual machine has started successfully, deleting said first virtual machine; and if said second virtual machine has not started successfully, then:

dismounting second virtual hard drive by said second host operating system;

mounting said first virtual hard drive by said first host operating system; and un-pausing said first virtual machine.

19. The computer-readable storage medium comprising computer-readable instructions of claim 15 further comprising instructions whereby said device state and said memory state comprise at least one specific state from among the following group of specific states: a state of processor registers; a state of virtual hardware; and a state of working memory.

20. The computer-readable storage medium comprising computer-readable instructions of claim 15 further comprising instructions whereby said memory state is transferred incrementally by use of a demand paging process wherein elements of said memory state of said first virtual machine are prioritized based on what said second virtual machine immediately requires.

21. The computer-readable storage medium comprising computer-readable instructions of claim 15 further comprising instructions whereby said set of disk information comprises at least one information item from among the follow group of information items: a pointer: a URL: and a reference mechanism.

* * * * *